(12) United States Patent
Davidson et al.

(10) Patent No.: US 6,265,788 B1
(45) Date of Patent: Jul. 24, 2001

(54) WIRELESS INDUCTION LOOP CONTROL SYSTEM

(75) Inventors: Lee Davidson, Irving; Eric Valentine, Dallas, both of TX (US)

(73) Assignee: Ericsson Inc., Richardson, TX (US)

( * ) Notice: Subject to any disclaimer, the term of this patent is extended or adjusted under 35 U.S.C. 154(b) by 0 days.

(21) Appl. No.: 09/434,778

(22) Filed: Nov. 5, 1999

(51) Int. Cl.$^7$ ............................................ B60R 21/32
(52) U.S. Cl. ........................... 307/11; 307/9.1; 307/10.1; 455/41
(58) Field of Search ......................... 307/11, 10.1, 40, 307/10.4, 9.1; 455/41; 361/171

(56) References Cited

U.S. PATENT DOCUMENTS 3,809,816 * 5/1974 Reed et al. ....................... 179/15 FD
4,061,972 * 12/1977 Burgess ................................. 325/16
4,471,356 * 9/1984 Gidl ..................................... 340/989
4,685,396 * 8/1987 Birse et al. ........................... 102/206
5,856,710 * 1/1999 Baughman et al. ................. 307/10.1

* cited by examiner

Primary Examiner—Josie Ballato
Assistant Examiner—Robert L. Deberadinis
(74) Attorney, Agent, or Firm—Arthur I. Navarro (57) ABSTRACT

A wireless control system (30, 70) for distributing electrical control signals to a plurality of controlled devices (36a, 36b, 36c, 74a and 74b), including an electronic control unit (ECU) (32, 72) adapted to communicate with one or more controlled devices (36a, 36b, 36c, 74a and 74b) and an induction loop (34, 73) coupled to the ECU (32, 72) and adapted to provide a magnetic field within the range of the controlled devices (36a, 36b, 36c, 74a, and 74b). Each controlled device (36a, 36b, 36c, 74a and 74b) includes an induction coil (42a, 42b, 42c, 76a and 76b) tuned to couple signals modulated within the magnetic field of the induction loop (34, 74). The controlled devices (74a and 74b) may include a sensor (82a, 82b) and may be adapted to send a status signal (84) to the ECU (72) via the induction loop (73).

23 Claims, 6 Drawing Sheets

WIRELESS INDUCTION LOOP CONTROL SYSTEM

TECHNICAL FIELD OF THE INVENTION

This invention relates generally to communications systems, and more particularly to a wireless control system for communicating control signals to a plurality of electronically controlled devices such as the radio, climate control, and air bag systems of an automobile.

BACKGROUND OF THE INVENTION

An automobile can contain numerous electronic subsystems. Examples include the radio, windshield wipers, cruise control and ignition systems, among others. In modern automobiles, such systems can be linked together through an array of control wires that provide the signaling links between the systems and a micro-processor adapted to communicate with and/or control the systems. Each subsystem is typically also connected to power and ground wires. This arrangement of power, ground and control is typically bundled into a wiring harness, which may consume considerable space under the dash of the automobile.

Remote control systems have been used for years in television, stereo, lighting system and garage door applications, for example. Most remotes operate using infrared (IR) or radio frequency (RF) signals. In general, IR technology requires that the remote be pointed directly at the controlled device so an IR light beam may be transmitted to a light sensor, while an RF system can operate without a direct line-of-sight from the controller.

While IR and RF signaling may be suitable for some applications, they are not particularly well adapted for use in tight spaces such as underneath the dash of an automobile. Most often, copper wire is the material of choice for wiring harness applications, although fiber-optic cabling may be a useful alternative. With either medium, however, space is consumed due to the physical routing of cables from the controlling device to the controlled devices.

Figure 1:
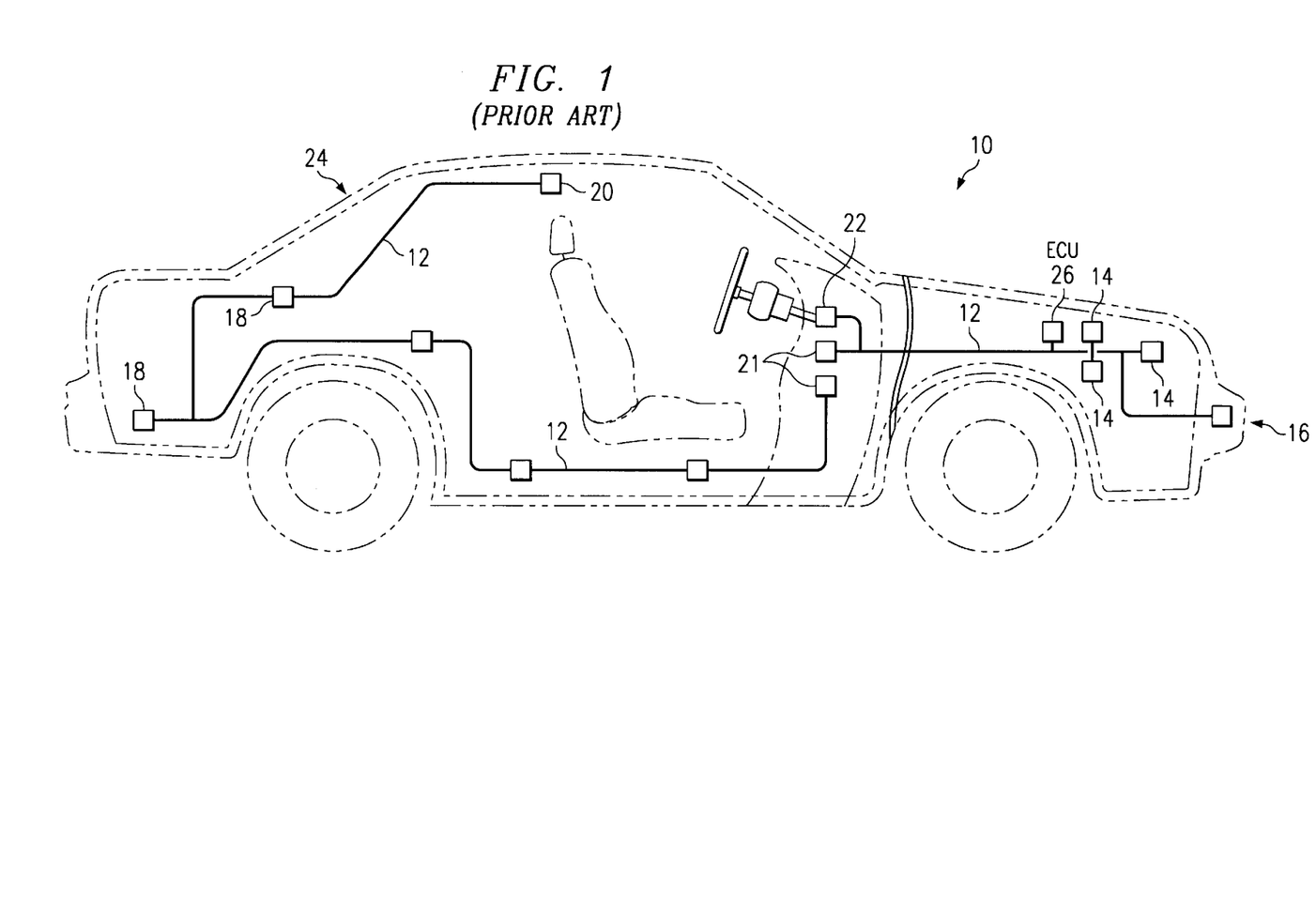
FIG. 1 illustrates an automobile having a wiring harness according to the prior art.

To illustrate, FIG. 1 depicts one application with an automobile 10 having a wiring harness 12 physically coupled to a plurality of controlled devices 14, 16, 18, and 20 located throughout the vehicle. An electronic control unit (ECU) 26 is also coupled to the wiring harness 12 and adapted to transmit control signals over the wiring harness 12 to the various devices 14, 16, 18, and 20 of the automobile 10. A control mechanism 22 is also coupled to the wiring harness 12 which is operable by a driver of the automobile to indicate which devices the ECU 26 should activate. The devices 14, 16, 18 and 20 are representative of a wide array of electronically controlled components of the automobile 10 such as the headlights 16, rear brake lights 18, and overhead lights 20, for example.

The automobile wiring harness 12 would include the control wires routed from the front to the back of the automobile, split off to various devices and subsystems of the vehicle. Some devices include a relay that is activated by a control signal that, for example, can cause the device to turn ON and OFF. Automobile manufacturers currently invest several hundred dollars per vehicle in wiring harnesses for distributing power, control and status signals. These wiring harnesses are difficult to install, being located in hard-to-reach places, such as underneath the dash or along side the firewall. In addition, wiring harnesses of modern automobiles have more wires than those of the past, due to technological improvements and more strict regulations imposed on automobile manufacturers, requiring the installation of various pollution, fuel efficiency, and safety systems, among others, in automobiles.

Replacing modern automobile wiring harnesses with an IR or RF counterpart would be impractical. IR systems require a direct line-of-sight between the ECU 26 and each device 14, 16, 18, 20 and 21 in the automobile 10. While reflective surfaces could be located and angled to direct signals from the transmitting control unit to individual components, the cost and complexity of such a solution would be prohibitive.

An RF operated device would also be impractical since they are effected by and can cause noise and/or interference from and with other systems in close proximity. In addition, RF frequencies are regulated and licensed by governmental agencies such as the FCC.

A wireless control system for communicating control signals to a plurality of electronic devices, such as those found in an automobile, over a relatively short distance, eliminating the need for expensive, bulky, and difficult-to-install wiring harnesses would provide numerous advantages.

SUMMARY OF THE INVENTION

The present invention achieves technical advantages as a system and method for communicating wireless control signals in a system having a plurality of controlled electronic devices such as those found in an automobile. In one embodiment, disclosed is a wireless control system for distributing electrical control signals to a plurality of controlled devices, including an electronic control unit (ECU) adapted to communicate with one or more controlled devices, and an induction loop coupled to the ECU and adapted to provide a magnetic field within the range of the controlled devices, wherein each controlled device is adapted to receive control signals from the ECU via the induction loop.

In another embodiment, disclosed is a wiring harness for distributing electrical control signals in an automobile including an electronic control unit (ECU) adapted to communicate with one or more vehicular systems of the automobile, and an induction loop coupled to the ECU and adapted to provide a magnetic field within the communications range of the vehicular system. A plurality of control elements are arranged throughout the automobile to receive control signals from the ECU via the induction loop. Each of the control elements includes an induction coil tuned to couple signals modulated within the magnetic field of the induction loop.

Also disclosed is a method of communicating electrical control signals to a plurality of controlled devices in a wireless control system having an electronic control unit (ECU), an induction loop coupled to the ECU and adapted to provide a magnetic field within the range of the controlled devices. Each controlled device has an induction coil tuned to couple signals modulated within the magnetic field of the induction loop. The method includes generating a wireless electric control signal and transmitting the wireless electric control signal to the controlled devices.

Advantages of the invention include the elimination of wiring harnesses, and/or a reduction in the number of wires required in existing wiring harnesses, resulting in space and cost savings, and a reduction in installation time. The present invention is particularly advantageous for use in noisy environments of an automobile, because of the inherent low interference susceptibility of induction loop technology.

BRIEF DESCRIPTION OF THE DRAWINGS

The above features of the present invention will be more clearly understood from consideration of the following descriptions taken in connection with accompanying drawings in which.

Corresponding numerals and symbols in the different figures refer to corresponding parts unless otherwise indicated.

DESCRIPTION OF THE PREFERRED EMBODIMENTS

The disadvantages of IR and RF for wireless control systems in certain applications has been discussed. A wireless technology better suited for rugged and/or small space applications, such as automotive, is induction loop technology, or electromagnetic induction fields. Electromagnetic induction fields are used in a variety of electronic applications today, and are a fundamental principle behind such devices as transformers, where a current sent through a first winding creates an electromagnetic field that induces a current in a secondary winding.

While induction loop technology has been used in various technical fields, it use in wireless applications has been limited. One such application is an auditorium or room (such as a church) wired with a transmitting induction loop positioned along one wall or along the floor for transmitting a speech signal for the hearing impaired at a particular frequency. The transmitting induction loop is driven with an analog signal from a stereo amplifier. The speech signal may be received by a hard-of-hearing person equipped with a hearing aid and adapted to receive the speech signal at the transmitted frequencies. A small receiver within the hearing aid detects the current induced by the transmitting induction loop. The transmitting induction loop in such a system must be oriented carefully to prevent half-wave phase cancellations of the signal.

The present invention utilizes induction loop technology to provide a general-purpose limited distance induction loop communications system. A plurality of controlled electronic devices are adapted to receive a control signal generated by an Electronic Control Unit (ECU) and transmitted via an induction loop. Each controlled device can be adapted to respond to a unique frequency band, if analog, or address and interrupt code, if digital, and the control signal can be multiplexed or modulated.

Figure 2:
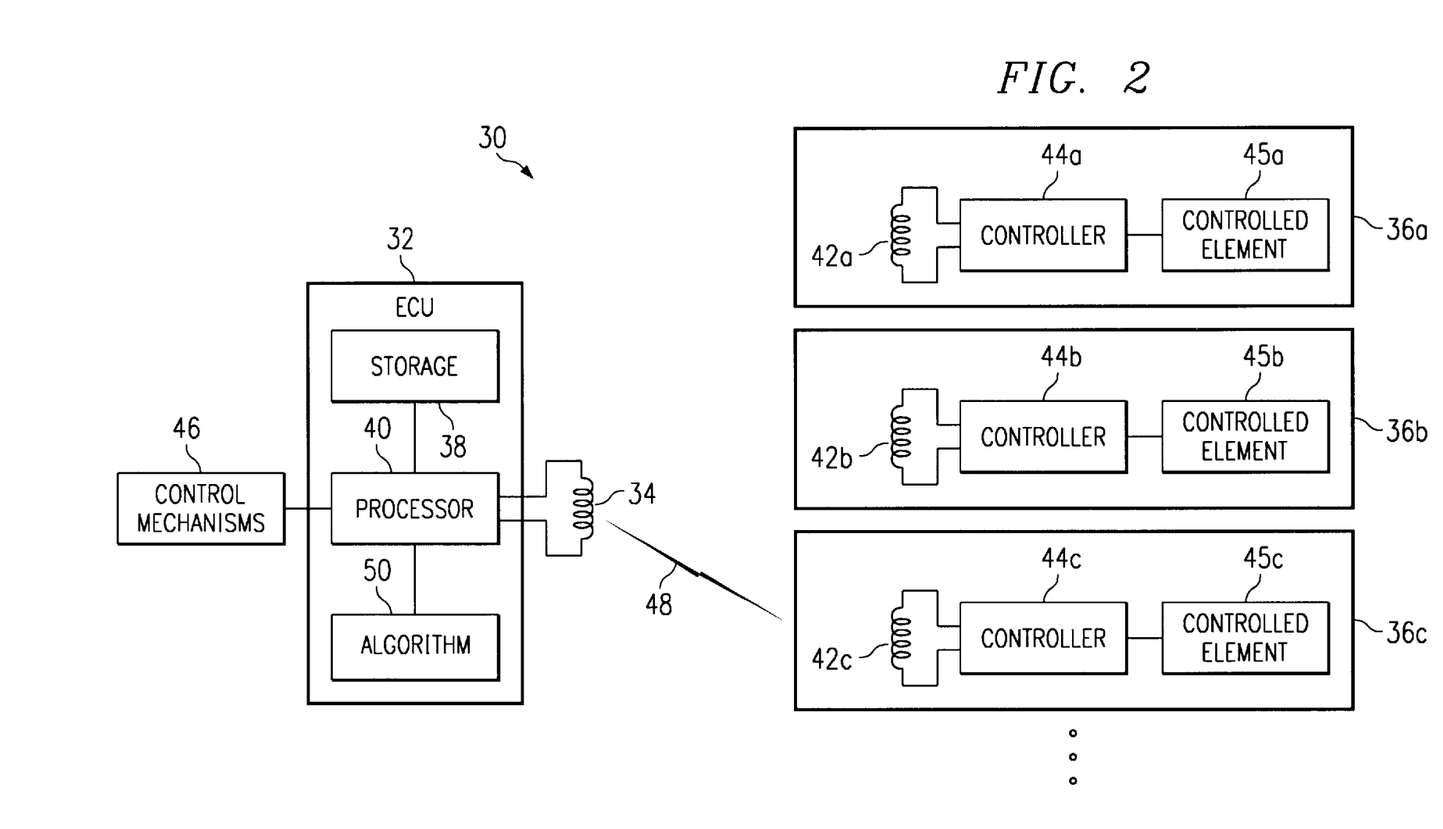
FIG. 2 illustrates a block diagram of a first embodiment of the present invention with an Electronic Control Unit (ECU) sending control signals via an induction loop to a plurality of controlled devices.

Referring to FIG. 2, therein is illustrated a first embodiment of the present invention, as a wireless control system 30. The wireless control system 30 comprises an electronic control unit (ECU) 32 having a processor 40 for generating a wireless control signal 48 The processor 40 can be controlled by an embedded algorithm 50 that provides program and operating instructions for use by the processor 40. The ECU 32 is coupled to an induction loop transmitting antenna 34 that transmits the wireless control signal 48 generated by the processor 40 of the ECU 32. The wireless control signal 48 comprises an electromagnetic field produced by a current flowing through the induction loop 34. The Electromagnetic Field (EMF) produced by the induction loop 34 substantially decreases as the distance away from induction loop 34 increases, to an order of magnitude equal to the inverse cube of the distance. Accordingly, the induction loop 34 is preferably placed within the reception range of the devices 36a, 36b and 36c that will be receiving the wireless control signal 48. The relatively short distance between the induction loop 34 and the devices 36a, 36b, and 36c limits interference with systems that would otherwise be susceptible to such interference and/or noise which are outside the desired operating reach of the wireless control system 30.

Each device 36a, 36b and 36c has an induction coil 42a, 42b and 42c, respectively. The induction coils 42a, 42b and 42c are small and inexpensive, as are commonly available in industry. Preferably, the induction coils 42a, 42b and 42c are adapted to receive the wireless control signal 48. Each device 36a, 36b and 36c also has controller 44a, 44b and 44c communicably coupled to induction coils 42a, 42b and 42c, respectively. The controllers 44a, 44b and 44c are coupled to and adapted to operate and control the elements 45a, 45b and 45c, respectively.

In one embodiment, the induction coils 42a, 42b and 42c are configured such that a time rate of change of magnetic flux through the receiving induction coils 42a, 42b, or 42c generates a voltage in the device controller 44, indicating to either turn ON or OFF the element 45 as indicated in the wireless control signal 48. The wireless control signal 48 comprises an electromagnetic field that induces a current in the windings of the induction coils 42a, 42b and 42c of controlled devices 36a, 36b and 36c, respectively.

The wireless control system 30 may also include a control mechanism 46 coupled to the ECU 32 and operable by an individual utilizing the wireless control system 30. For example, a user of the wireless control system 30 can set levers or buttons of the control mechanism 46 to the desired settings, indicating which devices 36a, 36b, and/or 36c are to be activated. The ECU 32 may comprise an electronic storage means 38, such as a database or other electronic repository, containing default status indicators or other startup parameters (normally ON or OFF) of the devices 36a, 36b and 36c, for example. The storage means 38 may be queried by the processor 40 upon startup, for example, to determine whether a particular device should be activated. Various devices and components can be used to implement the storage means 38 such as Random Access Memory (RAM), Read Only Memory (ROM), or other similar memory device.

Figure 3:
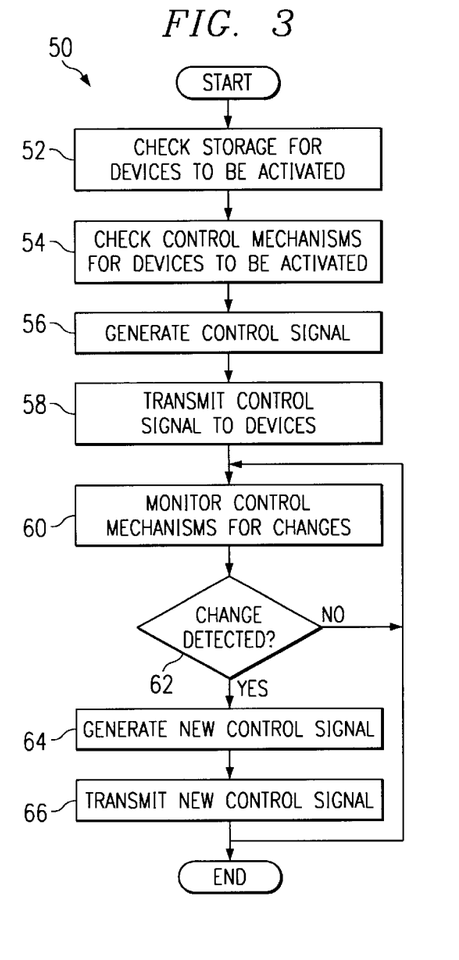
FIG. 3 is a process flow diagram illustrating the method of using the wireless induction loop control system according to one embodiment of the invention.

With reference to FIG. 3, a process flow diagram for a method 50 of utilizing the induction loop 34 to control electronic devices according to one embodiment is shown. First, the wireless control system 30 is activated or turned ON when, for example, the ignition key of an automobile is toggled to the ON position. The processor 40 checks the storage means 38 to determine which devices 36 should be powered at startup (step 52). Likewise, the control mechanism 46 can be employed by a user of the system 30 to activate any of the controlled devices 36 via the wireless control system 30 (step 54). For example, the control mechanism 46 could represent the ON/OFF switch of a radio, or air conditioning unit within an automobile, or any other user interface to the various devices found in an automobile.

The processor 40 generates the wireless control signal 48 (step 56) associated with a power ON sequence by inducing a field in the induction loop transmission antenna 34 (step 58). The devices 36 of the wireless control system 30 receive the wireless control signal 48 (e.g., a current is induced in the induction loops 42a, 42b and 42c by the electromagnetic field of the wireless control signal 48) and the devices 36 are activated.

Process 50 continues with the processor 40 repeatedly monitoring the control mechanism 46 for requests from users to change the state of any of the devices (step 60). If a user of the wireless control system 30 desires to activate the device 36a, the control mechanism 46 can be operated by the user to cause power to the applied to the device 36a using the induction loop 34 to communicate with the device 36a. Operation of the control mechanism 46 can be detected by the processor 40 of the ECU 32. Next, if the processor 40 detects a change (step 62), the processor 40 generates a new control signal 48 (step 64), and transmits it via the induction loop 34 to cause a change in state of the device 36a under control (step 66). The processor 40 continues to monitor the control mechanism 46 to determine when it has been operated by a user.

Figure 4:
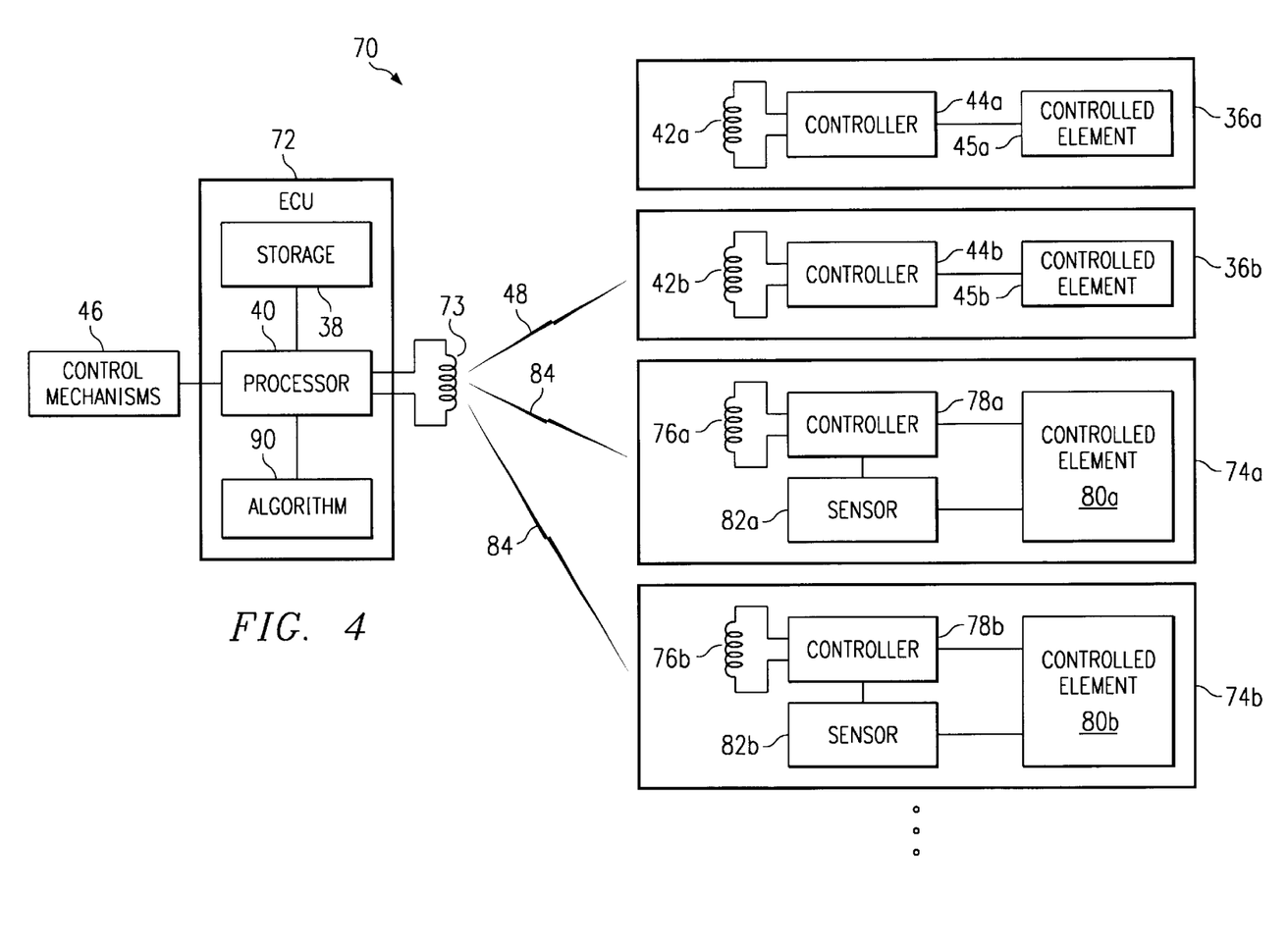
FIG. 4 is a process flow diagram illustrating a second method of utilizing the wireless induction loop control system according to a second embodiment of the present invention where at least one controlled device has a sensor and is adapted to transmit status signals to the ECU.

FIG. 4 is a block diagram of a wireless control system 70 providing bi-directional communications between ECU 72 and controlled devices 74a and 74b. The wireless control system 70 has an ECU 72 coupled to an induction loop 73 adapted to receive status signals 84 from devices 74a and 74b, each having a sensor 82a and 82b, respectively, and an induction coil 76a and 76b, respectively, adapted to send status signals 84 based on information received by sensors 82a and 82b. Sensors 82a and 82b are adapted to detect the status of the controlled elements 80a and 80b. For example, the sensors 82a and 82b may detect low fuel levels or whether a light bulb has burned out. Other controlled devices 36 or controlled and sensing devices 74 maybe deployed elsewhere within the wireless control system 70.

Figure 5:
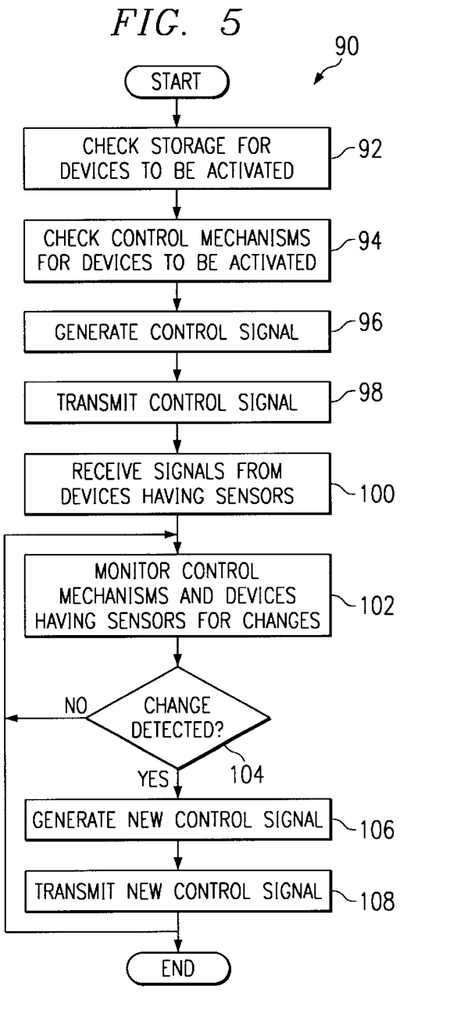
FIG. 5 is a process flow diagram for a method of utilizing a wireless control induction loop system according to a third embodiment of the present invention.

With reference to FIG. 5, therein is shown a process flow diagram for a method 90 of operating the wireless control system 70. The storage means 38 is examined to determine which devices 74 should be activated by the wireless control system 70 (step 92). Next, the processor 40 examines the control mechanisms 46 for devices 36 to be activated (step 94). The processor 40 of the ECU 72 generates a wireless control signal 48 (step 96), and transmits the wireless control signal 48 using the induction loop transmitting antenna 73 (step 98). The induction loop 73 receives signals from devices 74a and 74b having sensors 82a and 82b (step 100).

Next, the processor 40 repeatedly monitors the control mechanism 46 and devices 74 having sensors 82 to detect any requested changes by the user (step 102). This may correspond to a user of the wireless control system 70 turning up the volume of a radio, increasing the fan speed of the climate control system, or engaging the cruise control system, for example. If a change is detected (step 104), the processor 40 generates a new altered control signal 48 (step 106) and transmits the new control signal 48 to the devices 36 and 74 via the induction loop transmitting antenna 73 (step 108).

The technology used to generate and receive the wireless control signals for the present invention is preferably electromagnetic induction fields. The induction coils 42a, 42b, 76a and 76b are generally small, low-cost, and comprise several turns of fine wire around a small ferrite core. The wireless control signal 48 transmitted by the induction loops 34 and 73 may be analog and encoded by frequency division multiplexing (FDM), where each of the device induction coils 42a, 42b, 76a, and 76b is responsive to a unique frequency band. The frequency sensitivity of each induction coil 42a, 42b, 76a and 76b may be tuned during the physical design stage and may be adjusted by varying the core size and coil windings. The frequencies generated by the induction loops 34, 73 can be determined by the software for the ECU 32, 72.

Alternatively, the wireless control signal 48 may be digitally encoded and modulated in an analog carrier signal before transmission, for example. Digital encoding increases security and allows encryption of the wireless control signal 48 and status signals 84. Since the throughput requirements of the wireless control system 30 or 70 are generally low, relatively unsophisticated coding techniques can be utilized to generate the appropriate control signals to the controlled devices. The waveform of the control signal 48 can be chosen to limit bandwidth and to keep low frequencies out of the spectrum. In one embodiment, a coding scheme similar to those used for magnetic digital recording could be utilized.

To avoid multiple frequency allocations, and to reduce the used spectrum, the wireless control systems 30 and 70 may be configured to operate digitally, similar to the bus system in a computer yet without the wiring. In such a scenario, each of the electronic devices 74 is responsive to a specific address and interrupt code. The address is the equivalent of an Input/Output (I/O) port address, and the interrupt code is equivalent to an IRQ, but multiplexed into the main data stream. This allows for greater expansion and population of devices handled by the system, and may be standardized so that a particular device would work in any car. Some Error Detection and Correction (EDAC) may be necessary to control errors, similar to the EDAC used in computer systems. Other multiple access methods may be implemented with this invention, as will be apparent to one of ordinary skill in the art.

Figure 6:
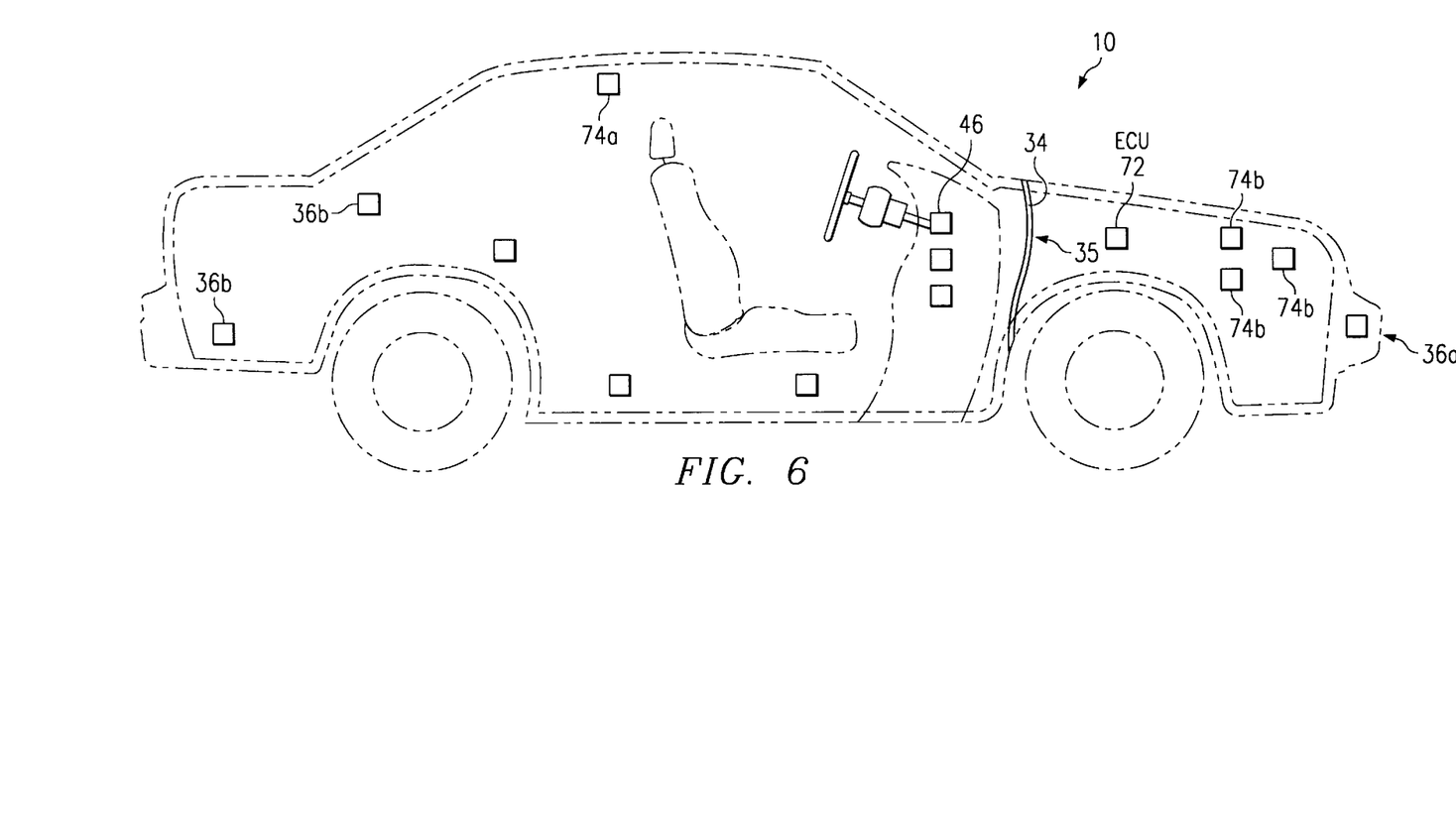
FIG. 6 illustrates the wireless control system according to another embodiment of the invention.

One application of the wireless control systems 30 and 70 of the present invention is within an automobile to replace the standard wiring harnesses and long lengths of wire. Stretching between the automobile ECU and the radio, air conditioning, ignition and other systems found in modem transportation vehicles. An example of vehicular application is shown in FIG. 6. The ECU 72 can be mounted either under the dash, under the hood of the vehicle, or other convenient location. The controlled devices 36a, 36b, 74a and 74b are located throughout the automobile, and may comprise front headlights (36a), rear brake lights (36b), overhead light (74a), and various engine components (74b), as depicted in this example. Other devices include pollution control devices, engine management systems, environmental control systems, air bags, fuel efficiency, safety systems, entertainment systems, valves, switches, ignition systems, airflow conductors, and warning lights, for example. Software such as on-board-diagnostics 2 (OBD2) and emission control for existing automobile applications is transmitted via the induction loop 34 or 73 and is a part of the wireless control signal 48 of the present invention.

Figure 7:
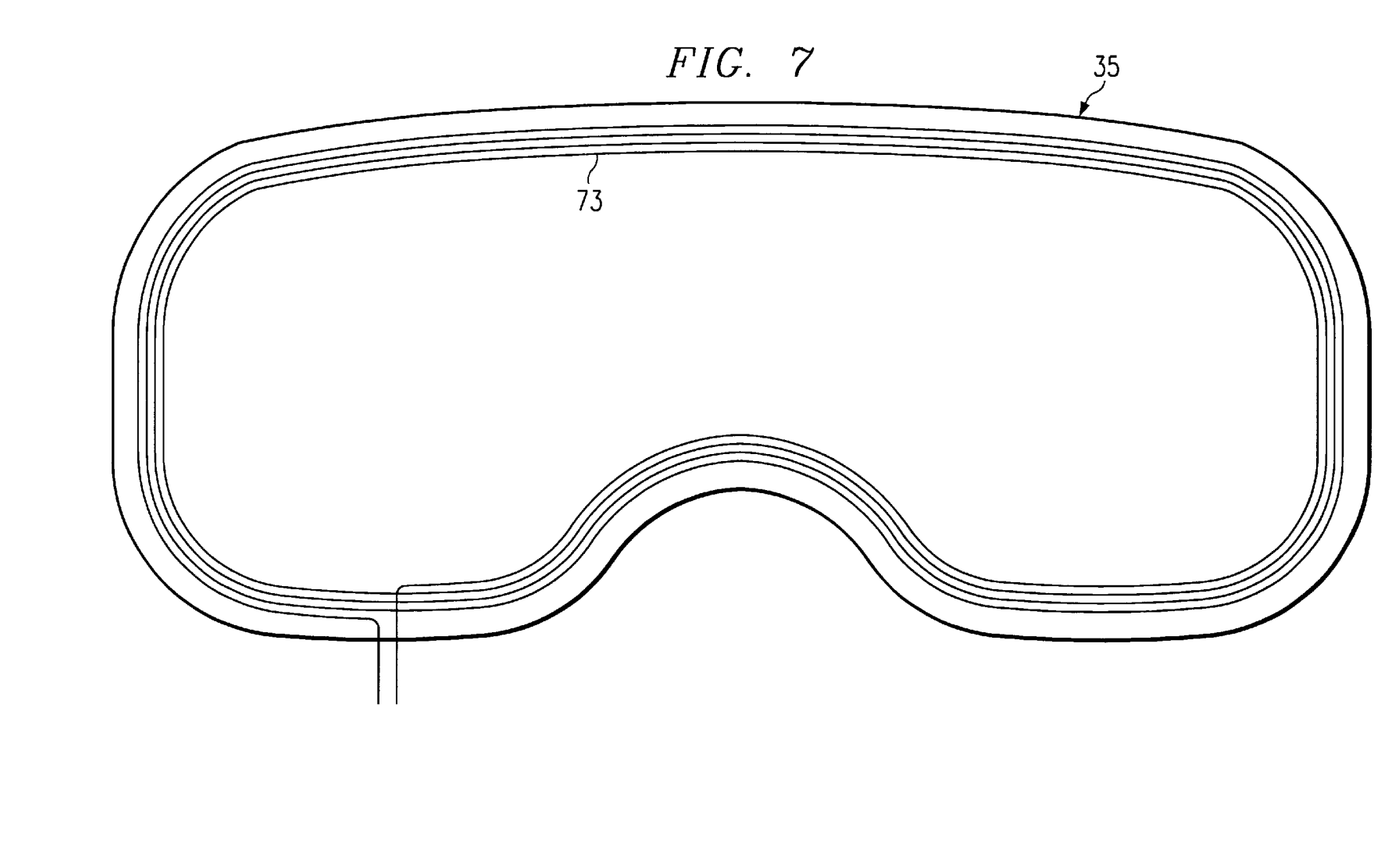
FIG. 7 shows the rear view of a firewall of an automobile, with an induction loop mounted substantially along the perimeter of the firewall.

The induction loop transmitting antenna 34 or 73 is preferably mounted vertically along the firewall 35 separating the engine compartment from the passenger compartment, as illustrated in FIG. 7. A firewall is a fireresistant panel positioned between the engine compartment and passenger compartment of an automobile. Mounting the induction loop 34 or 73 along the firewall provides good coverage towards the front and rear of the automobile. The induction loop 34 or 73 can be mounted vertically to prevent half-wave phase cancellation of the signal, which may occur if the induction loop 34 or 73 is mounted horizontally. The metal body of the vehicle acts as a shield, containing most of the radiation and making it easier to avoid introducing interference to and from other vehicles in close proximity.

There are many advantages provided by the present invention including the elimination of expensive and bulky wiring harnesses used in the past. Wiring is still required to supply power and ground, and, as such, the present invention allows a reduction of the number of wires in existing wiring harnesses. Fewer wires results in space and cost savings, and a reduction in installation time. Errors in connecting the wiring harness to the various components are eliminated. The present invention is particularly advantageous for use in the noisy environment of an automobile, because of the inherent low interference susceptibility of induction loop technology.

Though the invention has been described with respect to specific preferred embodiments, many variations and modifications will become apparent to those skilled in the art upon reading the present application. For example, the present invention may be implemented for any electronic system having a plurality of controlled electronic devices in communication over a relatively short distance, e.g. 45 feet or less, in order to reduce or eliminate the need for wiring harnesses. Applications include multi-media rooms, news media vans containing numerous electronic systems, entertainment systems, studios, offices, boats, aircraft, and space vessels. The control mechanisms 46 are preferably mounted within easy reach of the user, but other mechanisms may provide automatic activation, for example, the dome light 74a may be activated by the opening of a door of the vehicle. It is therefore the intention that the appended claims be interpreted as broadly as possible in view of the prior art to include all such variations and modifications.

What is claimed is:

1. A wireless control system for controlling a plurality of devices in an automobile using wireless control signals to said plurality of controlled devices, the system comprising:
    an electronic control unit (ECU) having a processor for generating a plurality of control signals communicating with one or more of said controlled devices; and
    an induction loop coupled to said ECU and configured to translate control signals generated by the ECU into corresponding electromagnetic fields produced by a current flowing through windings of said induction loop;
    wherein said controlled devices are configured to receive said wireless control signals from said ECU via said induction loop, each of said plurality of control devices including an induction coil tuned to a corresponding electromagnetic field generated by said induction loop through said windings.

2. The system according to claim 1 wherein said induction loop is mounted vertically on a firewall of said automobile.

3. The system according to claim 1 wherein said control signals are encoded using frequency division multiplexing (FDM).

4. The system according to claim 1 wherein each of said devices are configured to respond to a unique frequency band.

5. The system according to claim 1 wherein said control signals are digitally encoded prior to transmission with a unique identifier associated with a specific device.

6. The system according to claim 5 wherein said unique identifier comprises an address and an interrupt code.

7. The system according to claim 1 wherein at least one of said devices includes a sensor for detecting the status of said device.

8. The system according to claim 7 wherein said sensor is further adapted to transmit a signal indicting, the status of a device via said induction loop, said sensor adapted to provide bidirectional communications between said ECU and said device.

9. The system according to claim 1 wherein said automobile comprises at least one control mechanism communicably coupled to said ECU and adapted to permit a user to change the state of at least one device.

10. The system according to claim 9 wherein said processor is configured to repeatedly monitor said control mechanism and said devices with sensors in order to detect any requested changes by a user.

11. The system according to claim 1 wherein said ECU further comprises storage for storing control information of said devices and an algorithm for sending said control signal to said devices.

12. The system according to claim 1 wherein said electromagnetic field is adapted to substantially decrease as the distance away from said induction loop increases, to an order of magnitude equal to the inverse cube of the distance.

13. The system according to claim 1 wherein each of said plurality of devices further comprises:
    a controller communicably coupled to the induction coil; and
    an element;
    wherein said controller is coupled to and adapted to operate and control said element.

14. The system according to claim 1 wherein said induction coils are configured such that a time rate of change of magnetic flux through the receiving induction coils generates a voltage in the device controller, indicating to either turn ON or OFF the element as indicated in the wireless control signal.

15. In an automobile equipped with a wireless control system (the "System"), a method of communicating electrical control signals to the various electrically controlled devices of the automobile, said System including an electronic control unit (ECU), an induction loop coupled to said ECU and adapted to provide a magnetic field within the range of said controlled devices, each controlled device having an induction coil tuned to couple a range of frequencies modulated within said magnetic field, said method comprising the steps of:
    generating a wireless electric control signal; and
    transmitting said wireless electric control signal to at least one of said controlled devices.

16. The method according to claim 15 further comprising the step of encoding said wireless electronic control signal with a unique identifier associated with at least one of said controlled devices.

17. The method according to claim 16 wherein the step of encoding is performed using a unique address and interrupt associated with at least one of said controlled devices.

18. The method according to claim 15 wherein said system further comprises at least one control mechanism coupled to said ECU and further comprising the step of examining said control mechanism.

19. The method according to claim 15 wherein at least one said controlled device is adapted to transmit a wireless status signal and further comprising the steps of:

said controlled device sending a wireless status signal; and said ECU receiving said wireless status signal via said induction loop.

20. The method according to claim 15 wherein said electrical control signals are analog and further comprising the step of encoding said analog control signals prior to transmission.

21. The method according to claim 20 wherein said analog control signals are encoded using frequency division multiplexing (FDM).

22. The method according to claim 21 wherein said electrical control signals are digital and further comprising the step of encoding said digital control signals by modified frequency modulation (MFM).

23. The method according to claim 22 wherein said step encoding by MFM is performed by adding a unique address code and interrupt request sequence associated with a specific controlled device.

* * * * *